United States Patent

[11] 3,630,320

[72] Inventor Heinz Lochmann
Kuckucksweg 5, Oberstedten, Taunus, Germany
[21] Appl. No. 845,241
[22] Filed July 28, 1969
[45] Patented Dec. 28, 1971

[54] BRAKE DISK AND SUPPORT MEANS THEREFOR
6 Claims, 7 Drawing Figs.

[52] U.S. Cl. ..................... 188/18 A,
188/73.5, 188/218 XL, 192/70.2
[51] Int. Cl. ..................... B60t 1/06
[50] Field of Search ..................... 188/18 A,
218 A, 73.5, 205.3; 192/70.2

[56] References Cited
UNITED STATES PATENTS
3,438,464 4/1969 Barrington ............. 188/205.3 X FOREIGN PATENTS
438,968 12/1967 Switzerland ............. 188/18 A Primary Examiner—George E. A. Halvosa
Attorney—Karl F. Ross ABSTRACT: A disk brake is disclosed for a rotating element mounted on an axle journaled in an axle housing. The rotating element, e.g. a wheel, windlass or winch drum, is provided with a brake-disk carrier having a plurality of angularly spaced axial projections reaching in the direction of the axle housing. The disk and these projections are provided with grooves and mating lugs enabling axial movement of the disk, the grooves being bridged to prevent distortion. One brake shoe is mounted on the axle housing and confronts the disk surface remote therefrom while the other brakeshoe is shiftably actuatable disposed in a structure offset from the axle housing but secured thereto.

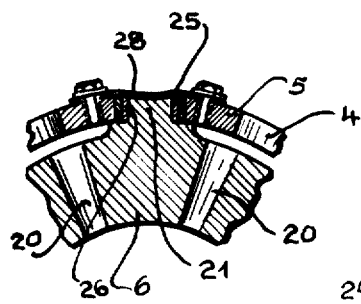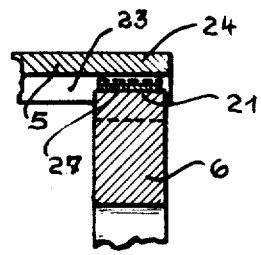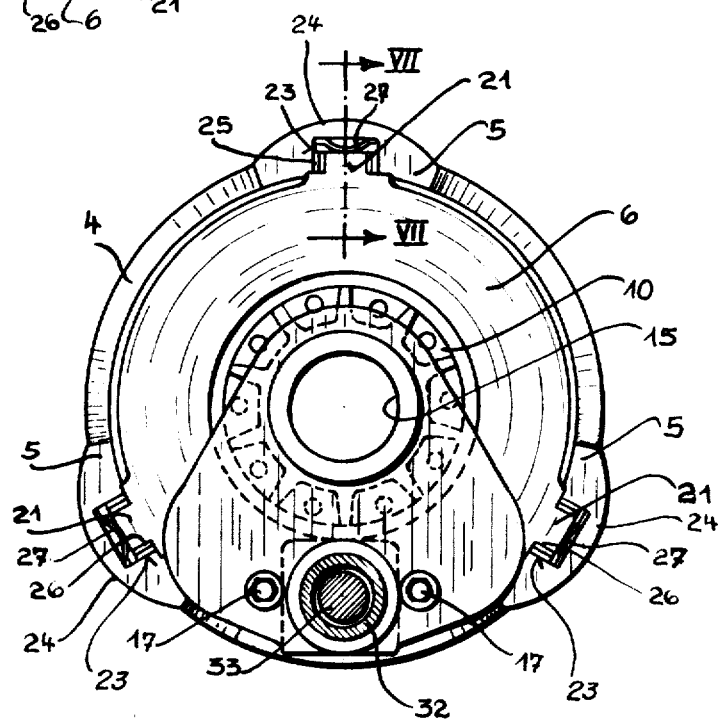

BRAKE DISK AND SUPPORT MEANS THEREFOR

The present invention relates to a disk brake for braking rotating machine parts, and more particularly those parts which are subject to heavy load pressures such as crane winches or windlasses and commercial vehicles of any kind.

The brake disk of the system is axially displaceable, its periphery being guided by a brake-disk carrier, and is provided with movable and a stationary brakeshoe; of which the brake forces of which are directly transmitted to the fixed axle journal to ensure safe braking of rotating machine parts which are subject to maximum loads. According to the present invention the brake furthermore permits easy assembly and, in addition, allows uncomplicated replacement of the brake parts which are subject to wear.

According to the present invention, the disk brake plate facing the axle journal for the rotating part is detachably connected with the second brake plate and an annular brake-disk carrier connected to the rotating part is provided with axially extending projections; the brake is provided with axially extending channels such as flots or grooves to entrain and support the disk, the periphery of which has lugs fitting into the channels of the brake-disk carrier. The lugs of the brake disk are laterally lined with exchangeable shims; if the recesses are open-ended slots, they may be bridged by reinforcing yokes. If the channels are designed as recesses or grooves on the inner surfaces of the projections or crenellations, the latter may bulge outwardly in the region of these grooves for greater mechanical stability.

Preferably, the brake-disk carrier is provided with three projections in order to leave a large space between said projections to facilitate assembly and replacement of the brake facings which are subject to wear so that replacement may be effected fast and at low cost without having to disassemble the brake.

The brake according to the present invention is adapted not only to receive major brake pressures but also to deal with permanent loads. This favorable feature is obtained by a good capacity for heat disposition and by using brake facings made from solid sintered-iron material as well as by coating the grooves and the lugs of the brake plate with corrosionproof and wear-resisting replaceable shims whereby premature wear of the groove edges and of the disk lugs is avoided. Heat discharge is facilitated in that 75 percent of the brake disk is exposed to the surrounding air for cooling and in that the brake disk is provided with ventilation openings. According to the present invention, the brake disk comprises two plates connected by radially extending ribs and made from a single casting. Owing to this design, the brake disk, upon braking, does not oscillate and operates without any noise.

According to another feature of the present invention, one of the brake plates unitary part together with the brake-shaft bearing to guarantee accurately adjusted guiding of the movable brakeshoe. In addition, said brake-shaft bearing is prevented from being contaminated so that constant maintenance by adding a lubricant is not required.

Another advantage of the disk brake according to the present invention is that it is suited for use with or attachment to stationary or nonstationary machine parts.

Apart from that it is noted that none of the parts of the brake does exceed the diameter of the brake disk so that the same may be incorporated into commercial rims, a fact which is of special importance in the case of utility machines.

Arrangement of the axle journal as separated from the central body by virtue of its exclusive connection with one of the brake plates is favorable in that, when the bearing is worn, it is merely necessary to replace the axle journal and the corresponding brake plate.

An embodiment of the present invention, and more particularly a disk brake for utility vehicles, is shown in and described with reference to the accompanying drawing in which:

FIG. 3 is a section of the brake plate together with the brake axles;

FIG. 4 is a section along line IV—IV in FIG. 3;

FIG. 5 is an enlarged view of a projection of the brake-disk carrier;

FIG. 6 is a section along line VI—VI in FIG. 5; and

FIG. 7 is a section along line VII—VII in FIG. 3.

Figure 1:
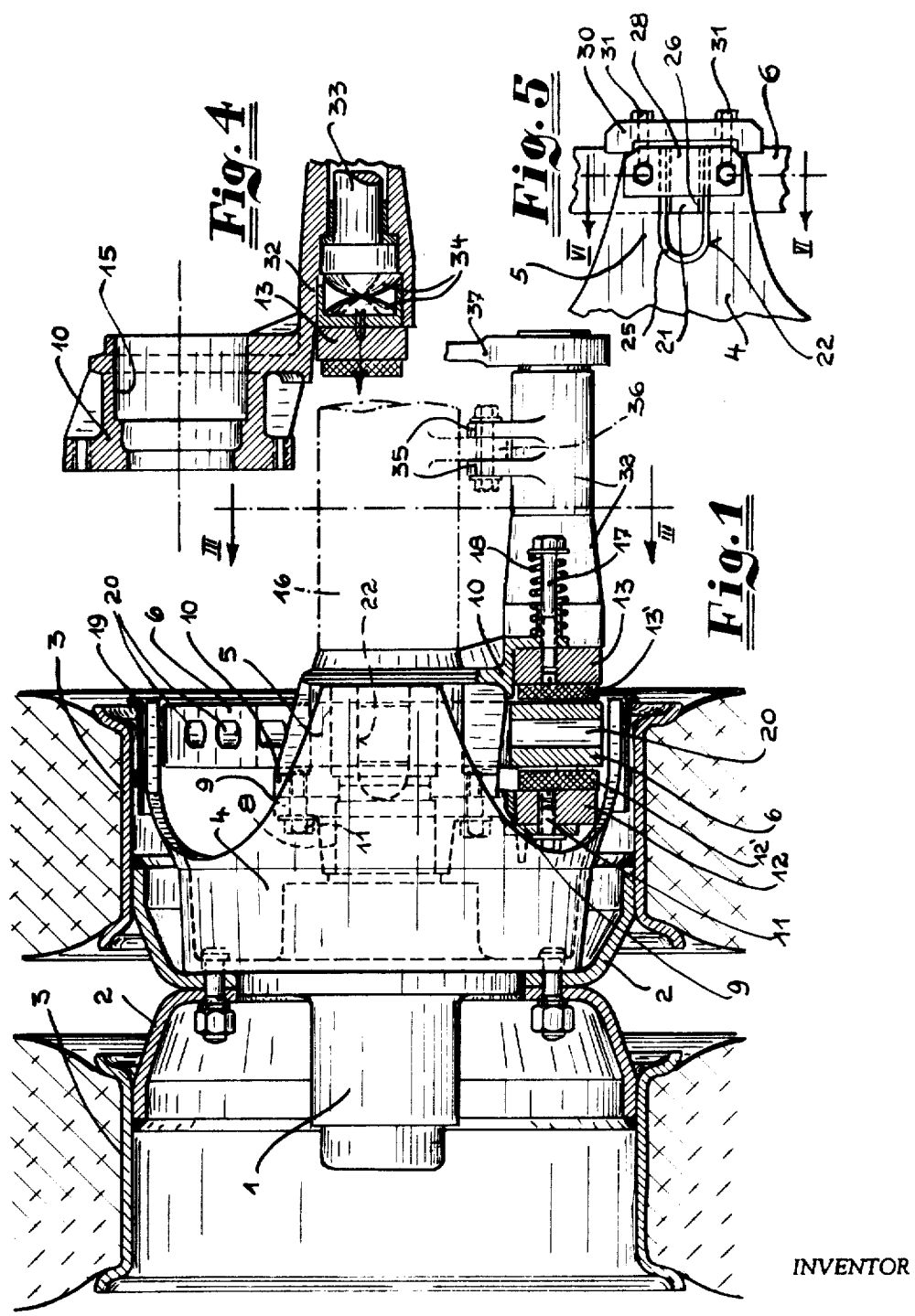
FIG. 1 is a lateral view, partly in section, of a disk brake according to my invention.
Figure 2:
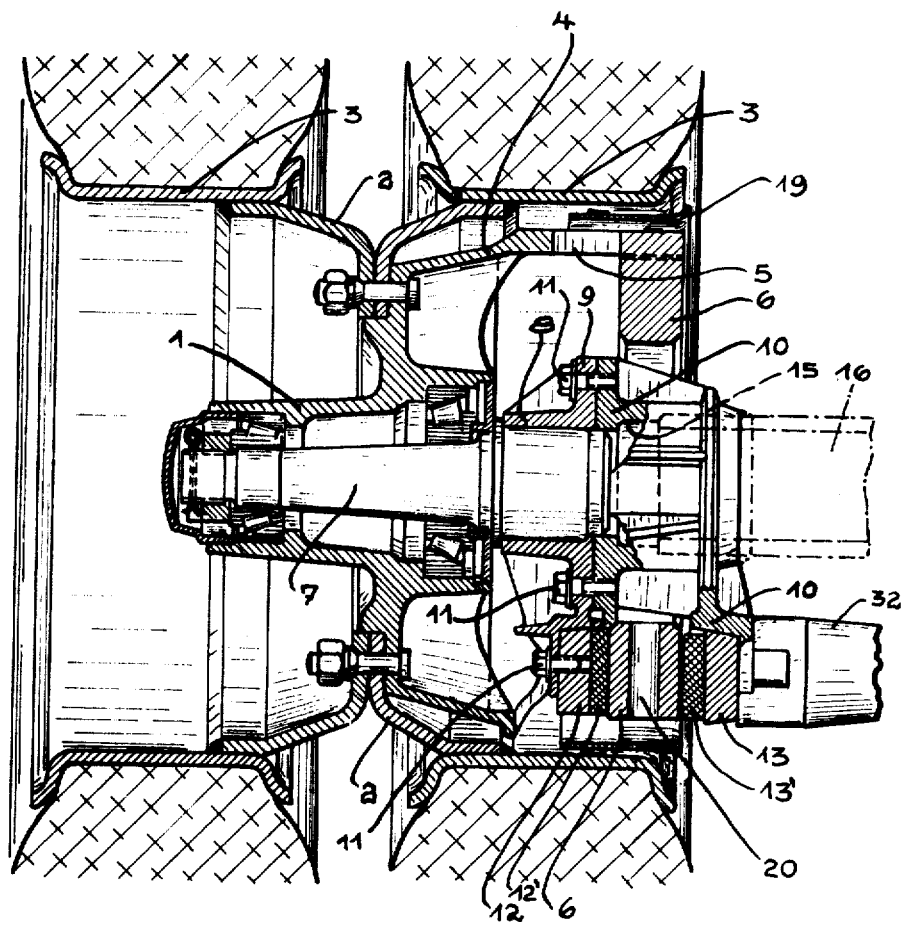
FIG. 2 is a longitudinal sectional view of the disk brake.

In FIGS. 1 and 2 the brake according to the present invention is shown in connection with utility vehicles having twin wheels. In these figures the numeral 1 defines the wheel hub which is detachably connected with the wheel disks 2 supporting the rims 3, and with the brake-disk carrier 4. Crenellations or projections of the carrier 4 are indicated at 5. The brake disk 6 is supported within the projections 5 of the brake-disk carrier 4, as will be described in detail hereinafter.

The axle journal 7 supported in the wheel hub engages the annular flange 8 of the brake plate 9 by means of one of its ends, this plate 9 supporting the stationary brakeshoe 12. The end of the axle journal 7 is welded to the annular flange 8. The brake plate 9 is detachably connected to the second brake plate 10 by means of the screws 11. The constructional feature of a detachable connection of the two brake plates as well as of the axle journal having been welded only to one of the brake plates permits replacements of the axle journal without having to disassemble the brake. The brake plate 10 is provided with a recess 15 adapted to be engaged by a tubular axle 16 which is preferably welded to the brake plate 10. The brakeshoe 13 belonging to brake plate 10 is movably connected to the latter by means of the screws 17. The spring 18 surrounding the screw 17 serves to retract the brakeshoe after termination of the braking operation. The brake facings or linings 12' and 13' may be of small dimensions in spite of the high brake power by using a solid sintered material whereby even the shoes may be of small dimension and the brake disk need be lined only within a limited area.

According to FIG. 4 the brake plate 10 is unitary with the brake-axle bearing 32, its engagement by the tube 16 resulting in accurate guiding of the nonstationary brakeshoe. For operating of the brake, the brake axle 33 is rotated and the brakeshoe 13 is displaced via the cams 34 into the direction of the brake disk. When the brake is mounted on a vehicle, the tube 16 is first inserted into the corresponding recess of the brake plate and, if necessary, welded to the same, whereupon the brake-axle bearing 32 is connected, via the eyes 35, with a flange 36 to be welded to the tube. In FIG. 1 the brake lever serving for the rotation of rod 32 is identified by numeral 37.

To improve heat shielding of the rim, a heat-discharge or dissipation plate 19 is provided between the cup-shaped brake-disk carrier 4 and the rim 3. The brake disk 6 is provided with recesses 20 in a manner known per se to improve ventilation, comprising two plates connected by radially extending ribs and made from a single casting.

The periphery of the brake disk is provided with three lugs or protuberances 21, for guidance and rotary entrainment, which engage in channels 22, 23 of the projections or crenellations 5 of the brake-disk carrier. These channels are either slots (cf. FIGS. 5 and 6), or grooves 23 within the projections, (cf. FIG. 3). In the embodiment according to FIG. 3 the projections of the brake-disk carrier are radially reinforced at 24 to prevent bending at the grooves 23 and thus to secure stable dimensions of said grooves. In addition, small plates or shims 25 or 26 are provided both within the cavity and at the sides of the lugs; these plates are made from noncorrosive and wear-resisting material and are replaceably mounted on coacting surfaces if the grooves and the brake-disk lugs respectively, such for positive guidance of the disk on its carrier. The leaf springs 27 serve to center the brake disk by bearing radially inward upon the ends of the lugs.

FIG. 7 is a sectional view of FIG. 3 and showing the mounting of the leaf springs 27 within the groove 23.

FIGS. 5 and 6 show a modification of the aforedescribed embodiment of the present invention in which the wear-resisting shims are also designated as 25 and 26; however, the bent leaf springs 28 which serve to center the brake disk are provided at the outside of the projections and screwed to the legs of the projections 5. In order to prevent widening of the slot 22 due to forces acting upon one of the legs of the projections, the face of the projection 5 is provided with a bridge 30 screwed to both legs by means of the screws 31.

As clearly shown in FIG. 5 and 7, the channels 22 or 23 are of considerably greater axial length than the mating lugs 21 whereby disk 6 can move freely inwardly (to the left in FIGS. 1 and 2) upon a wearing of brake lining 12'.

It is obvious that, when providing the brake at other rotating machine parts such as crane winches and windlasses, the axle journal 7 will merely have to be replaced by another bearing neck of a shaft while the tube 16 can be replaced by any other stationary support.

An advantage of the present disk brake is that it may be used for all purposes where rotating and loaded machine parts will have to be braked with a maximum of braking safety.

What I claim is:

1. In a disk brake for rotating element journaled on a fixed axle, said element being provided with an annular carrier centered on said axle, a brake disk transverse to said axle coupled with said carrier for entrainment thereby, and brakeshoe means mounted on aid axle but offset from the axis of rotation for arresting said brake disk, the improvement wherein said carrier is provided with a plurality of peripherally spaced, axially extending channels confronting the edge of said brake disk, said edge being provided with a plurality of peripherally spaced lugs respectively received in said channels with freedom of limited axial displacement therein, said carrier being further provided with releasable detent means at said channels for normally preventing disengagement of said brake disk from said carrier, and a set of leaf springs on said carrier spanning said channels and bearing radially inwardly upon said lugs; said improvement further including first and second shims removably mounted on coacting surfaces of said lugs and said channels in mutually contacting relationship for positive guidance of said disk on said carrier.

2. The improvement defined in claim 1 wherein said carrier is provided with a plurality of peripherally spaced crenellations provided with said channels.

3. The improvement defined in claim 2 wherein said channels are formed by throughgoing slots in said crenellations, said leaf springs being secured to the outer surfaces of said slots.

4. The improvement defined in claim 3 wherein said slots are open-ended and said crenellations are topped by reinforcing yokes bridging the open ends of said slots.

5. The improvement defined in claim 2 wherein said channels are grooves on the inner surfaces of said crenellations, said leaf springs being received in said grooves.

6. The improvement defined in claim 5 wherein said crenellations are radially enlarged in the region of said recesses.

* * * * *